United States Patent [19]

Yu

[11] Patent Number: 6,072,861
[45] Date of Patent: Jun. 6, 2000

[54] DEVICE TRANSMITTING AUDIO AND IMAGE INFORMATION REMOTELY VIA E-MAIL

[75] Inventor: Won Uk Yu, Daeku, Rep. of Korea

[73] Assignee: LG Electronics, Inc., Seoul, Rep. of Korea

[21] Appl. No.: 09/079,221

[22] Filed: May 15, 1998

[30] Foreign Application Priority Data

May 21, 1997 [KR] Rep. of Korea ..................... 97-19708

[51] Int. Cl.[7] ............................................. H04M 11/00
[52] U.S. Cl. ................................. 379/93.24; 379/88.14; 379/102.06
[58] Field of Search .............................. 379/90.01, 93.01, 379/93.05–93.08, 93.14–93.17, 93.24, 93.25, 100.08, 100.12, 102.06, 88.12–88.14, 88.17; 358/402

[56] References Cited

U.S. PATENT DOCUMENTS

| | | | |
|---|---|---|---|
| 5,760,823 | 6/1998 | Brunson et al. | 379/93.24 |
| 5,881,233 | 3/1999 | Toyoda et al. | 358/402 |

*Primary Examiner*—Wing F. Chan

[57] ABSTRACT

An audio and image information transmitting device transmits audio information stored in a telephone device having an answering machine and image information of a visitor from a doorphone system to an internet server by e-mail. The transmitting device converts inputted analog information to digital information, stores the digital information in a memory and outputs the same to the internet server by the e-mail system. An analog/digital converter of the device converts an inputted analog signal to a digital signal, and when the inputted signal is an image signal, an image processing encoder for encoding the digital image signal supplied from the analog/digital converter is additionally provided to the transmitting device.

20 Claims, 4 Drawing Sheets

DEVICE TRANSMITTING AUDIO AND IMAGE INFORMATION REMOTELY VIA E-MAIL

BACKGROUND OF THE INVENTION

1. Field of the Invention

The present invention relates to a technique to transmit audio information and image information, and more particularly to an audio and image information transmitting device that transmits sound recorded in a telephone device and image from a doorphone system by e-mail.

2. Discussion of the Background

A telephone device and a doorphone system are typically used as communication means as home appliances. The telephone device, which is widely used in order that an user inside the building may communicate with the other party, may have an additional function such as a recording function that automatically records a message of a caller when the user is not available as well as a typical function of direct communication between the user and the other party. Due to the additional recording function, the user may listen the message of the caller later when he/she gets back.

A user who is inside a building may identify a visitor through the doorphone system which includes a CCD camera for picking up an image of the visitor and a display means for displaying the image thereon.

FIG. 1 illustrates a conventional telephone device provided with an answering machine 100 which is connected with telephone lines L1 and L2.

As shown therein, the telephone device having the answering machine 100 is comprised of a microprocessor 101, a speech network unit 102, a tone ringer 103 and a recording/playback unit 104. The microprocessor 101 controls the operation of each unit of the device 100. The speech network unit 102 is connected with a handset 105 and forms a communication network. The tone ringer 103 rings a bell by receiving a ring signal which is inputted over the telephone lines L1, L2 and outputs a ring signal to the lines L1, L2, when the user makes a call by operating a keypad 106. The recording/playback unit 104 outputs a message informing that the user is not able to answer the phone or stores the message of the caller in an internal unit thereof. The ring signals which are externally applied over the telephone lines L1, L2 are detected over a condenser C1 and a resistor R1.

Reference HS is a hook switch, BD1 is a first bridge diode connected between the hook switch HS and the speech network unit 102, and BD2 is a second bridge diode connected with the tone ringer 103.

When the user picks up the handset 105 to make a phone call, the microprocessor 101 controls the hook switch HS to connected with a terminal SWb. In such off-hook state, when the user selects a telephone number using the keypad 106, the microprocessor 101 converts the inputted telephone number to a predetermined signal, and the signal passing through the speech network unit 103 and the first bridge diode BD1 is transmitted to the other party over the telephone lines L1, L2.

On the contrary, in an on-hook state which the hook switch HS is connected with a terminal SWa, when the user receives the phone call from the other party, the ring signal detected across the condenser C1 and the resistor R1 is transmitted to the tone ringer 103 over the second bridge diode BD2, thus the bell rings at the tone ringer 103.

The microprocessor 101 counts the number of the telephone rings.

When the user picks up the handset 105 before the predetermined number of times of the bell rings, the microprocessor 101 switches the state of the hook switch HS into the off-hook state, the communication network is formed by the speech network unit 102 so that the user can communicate with the caller, designating a telephone mode.

Meanwhile, if the user does not pick up the phone until the predetermined times of the bell ring, the recording/playback unit 104 operates under the control of the microprocessor 101 and outputs a message that the user is not available which designates a recording mode. The outputted message is transmitted to the caller over the telephone lines L1, L2 and an audio signal which corresponds to the message of the caller is recorded in the recording/playback unit 104 over the first bridge diode BD1 and the speech network unit 102. When the recording is finished, the hook switch HS is connected with the terminal SWb, driven by the microprocessor 101. In addition, the microprocessor 101 suspends the operation of the recording/playback unit 104, thereby completing the recording process.

When the user presses down the playback keys on the keypad 106, the recording/playback unit 104 is switched to the playback mode in accordance with the control of the microprocessor 101 so that the user may listen the message recorded in the answering machine.

However, according to the conventional telephone device having the answering machine, the recorded message is played back by which the user presses down the playback key. That is, since the telephone device is designed to be operated under the handling of the user, in order to listen the recorded message the user must manually operate the answering machine. To solve such a problem, the microprocessor 101 has an additional function to transmit the message recorded in the recording/playback unit 104 to the user when he/she calls and inputs an ID number from the outside. However, if the user receives the recorded message from a longdistance area or overseas, the user has to pay a great deal of telephone charges.

FIG. 2 illustrates a conventional doorphone system 300 in block diagram form.

As shown therein, the doorphone system 300 which enables an user inside the building to identify visitors is comprised of an external device 300A which is located out of the building and an internal device 300B installed in the building. The external device 300A is provided with a bell switch 301, a first microphone 302, a first speaker 306 and a CCD camera 307, and the internal device 300B is provided with a bell 309, a second speaker 312, a second microphone 313 and a liquid crystal display (LCD) 318.

When a visitor presses the bell switch 301, the bell signal is generated, converted in the bell 309 and transmitted to the second speaker 312 over a mixer 311 so that the user inside the building may hear the bell sound. The CCD camera 307 starts to operate when the bell switch 301 is pressed, picks up the image of the visitor and outputs a predetermined image signal corresponding to the image thereof. The image signal passing through a second output buffer 308 and an input buffer 316 is processed in an image processing unit 317 and the processed image is displayed in the LCD 318.

The first and second microphones 302, 313 and the first and second speakers 306, 312 are used for the communication between the user and the visitor. The voice of the visitor is transmitted to the user over the first microphone 302, a first amp 303, a first output buffer 304, a second amp 310, the mixer 311 and the second speaker 312, while the voice of the user is transmitted to the visitor side over the second microphone 313, a fourth amp 313, a third output buffer 315, a third amp 305 and the first speaker 306.

However, the conventional doorphone system also has a problem similar to the problem that the above-described telephone device having the answering machine has. That is, since the doorphone system must be manually operated by the user, the user can not identify the visitor from the remote distance.

SUMMARY OF THE INVENTION

Accordingly, an object of the present invention is to provide an audio information transmitting device that transmits a voice message recorded in an answering machine of a telephone device to an internet server by e-mail.

Another object of the present invention is to provide an image information transmitting device that transmits an image of a visitor which is picked up when the visitor uses a doorphone system to an internet server by e-mail.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an audio and image information transmitting device includes an information converting means for converting inputted analog information to digital information, a memory means for storing the digital information, and a microprocessor for outputting the information stored in the memory means by e-mail.

The information converting means includes an A/D converter, and further includes an image processing encoder for processing image information outputted from the A/D converter, if the converted information is the image information.

It is to be understood that both the foregoing general description and the following detailed description are exemplary and explanatory and are intended to provide and further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

For the convenience of description, an audio information transmitting device will be explained independently of an image information transmitting device.

Figure 1:
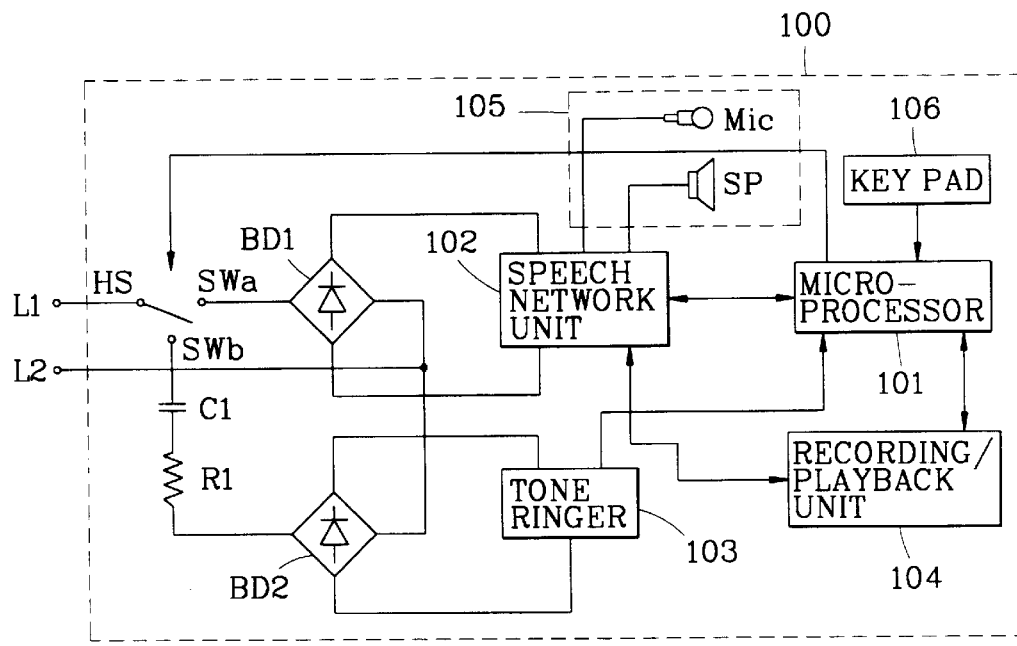
FIG. 1 is a block diagram of a conventional telephone device having an answering machine.
Figure 3:
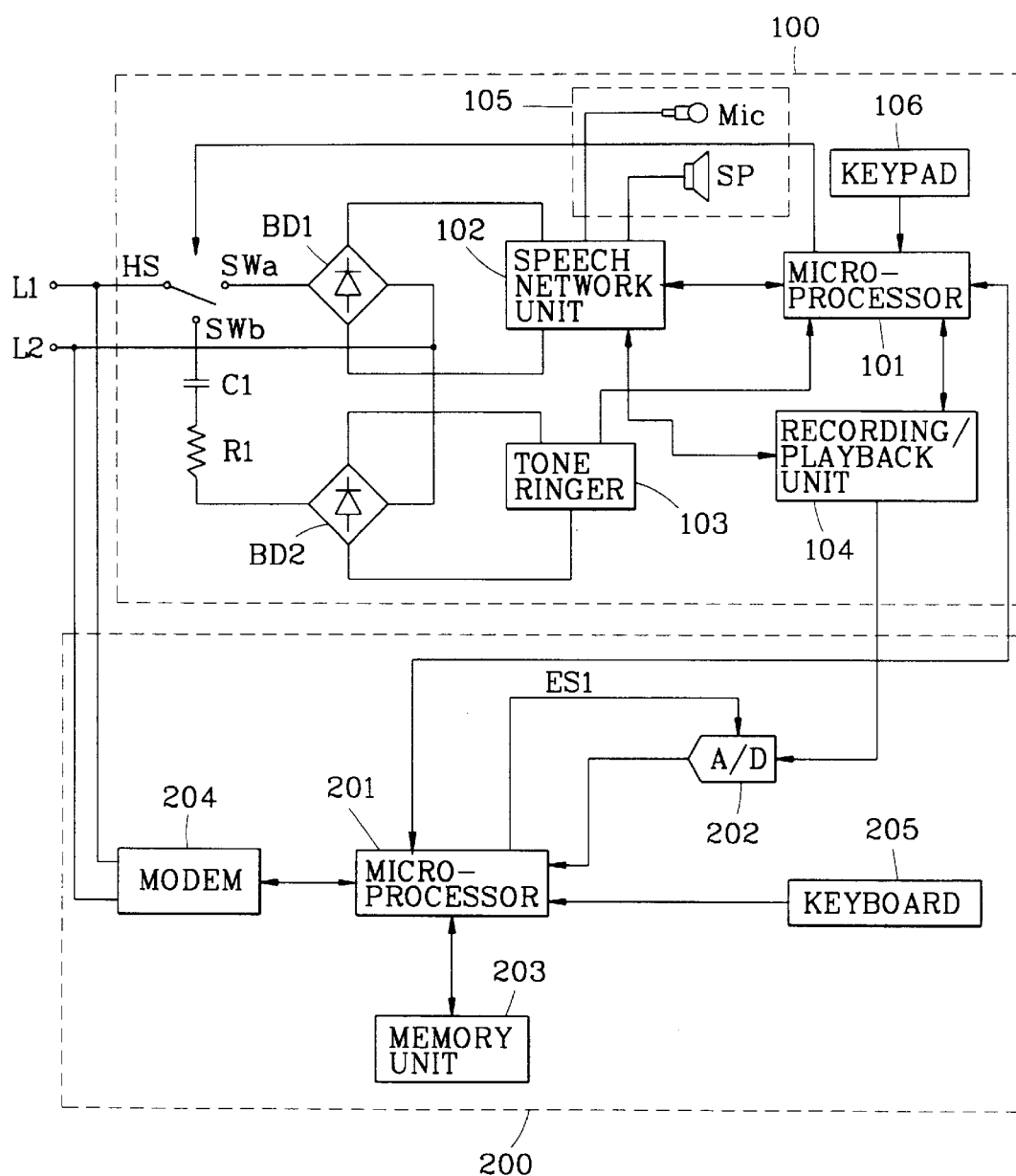
FIG. 3 is a block diagram of an audio information transmitting device according to an embodiment of the present invention.

FIG. 3 is a block diagram of an audio information transmitting device according to a first embodiment of the present invention. As shown therein, the audio information transmitting device is comprised of an telephone device having an answering machine 100 and an internet box 200. Here, the construction of the telephone device having the answering machine 100 is identical to the conventional art illustrated in FIG. 1.

The internet box 200 includes a microprocessor 201, an A/D converter 202, a memory unit 203 and a modem 204. The microprocessor 201 controls each unit of the internet box 200 when the telephone device 100 is switched to a recording mode. The A/D converter 202 starts to operate in accordance with the microprocessor 201 and converts an analog audio signal supplied from the speech network unit 102 to a digital audio signal. The memory unit 203 stores the digital audio signal which is converted by the microprocessor 201 and outputted over the modem 204. A keyboard 205 is used for turning on/off the internet box 200.

Since the operation of the device according to the first embodiment with respect to the telephone mode which the user directly communicates with the other party is the same as the conventional art, there will be only description of the operation with respect to the recording mode, that is the mode when the user is not available to take a phone call for any reason.

If the user does not pick up the handset 105 of the device 100 until the bell rings for the predetermined number of times, the microprocessor 101 operates the recording/playback unit 104 and the microprocessor 201 of the internet box 200, and the recording/playback unit 104 outputs a message that the user is not available and starts recording. The message is transmitted to the caller over the telephone lines L1 and L2, and an audio signal corresponding to the message of the caller is recorded in the recording/playback unit 104 and inputted to the A/D converter 202, over the first bridge diode BD1 and the speech network unit 102.

The A/D converter 202 starts operating in accordance with an enable signal ES1 which is supplied from the microprocessor 201 of the internet box 200 and converts an inputted analog audio signal to a digital signal, and the microprocessor 201 stores the digital signal in the memory unit 203.

When the caller finishes recording the message, the microprocessor 101 allows the recording/playback unit 104 to complete the recording process and informs the microprocessor 201 of the internet box 200 that the recording has been finished. Thus, the microprocessor 201 suspends the operation of the A/D converter 202, for thus completing the operation to store the digital data, corresponding to the message recorded in the recording/playback unit 104, in the memory unit 203.

After the digital data storing operation, the microprocessor 201 converts the stored digital data to a predetermined audio e-mail file type, such as a WAVE file or a real audio file.

The modem 204 is connected with an internet and logged into an e-mail server under the control of the microprocessor 201, and accordingly the microprocessor 201 transmits the audio e-mail file to a specific account of the e-mail server.

Accordingly, the user being remote from the telephone device connects the specific account of the e-mail server by the internet and searches the e-mail audio file to check the message recorded in the answering machine.

In addition, the microprocessor 201 can supply additional index information to the audio information, such as the time when the telephone device having the answering machine receives the message from the caller.

The microprocessor 201 is turned on/off in accordance with the key board 205. Accordingly, although the user is away from the local area of the audio information transmitting device according to the embodiment of the present invention, the user can turn on the internet box 200 by operating the keyboard 205. On the contrary, when the internet box 200 is intended to be on all the time, in other words, when the user wants the message recorded in the device to be transmitted to the internet server without fail, the internet box 200 is always in the on-state, and in the off-state only when the user intentionally handles the keyboard 205.

Figure 2:
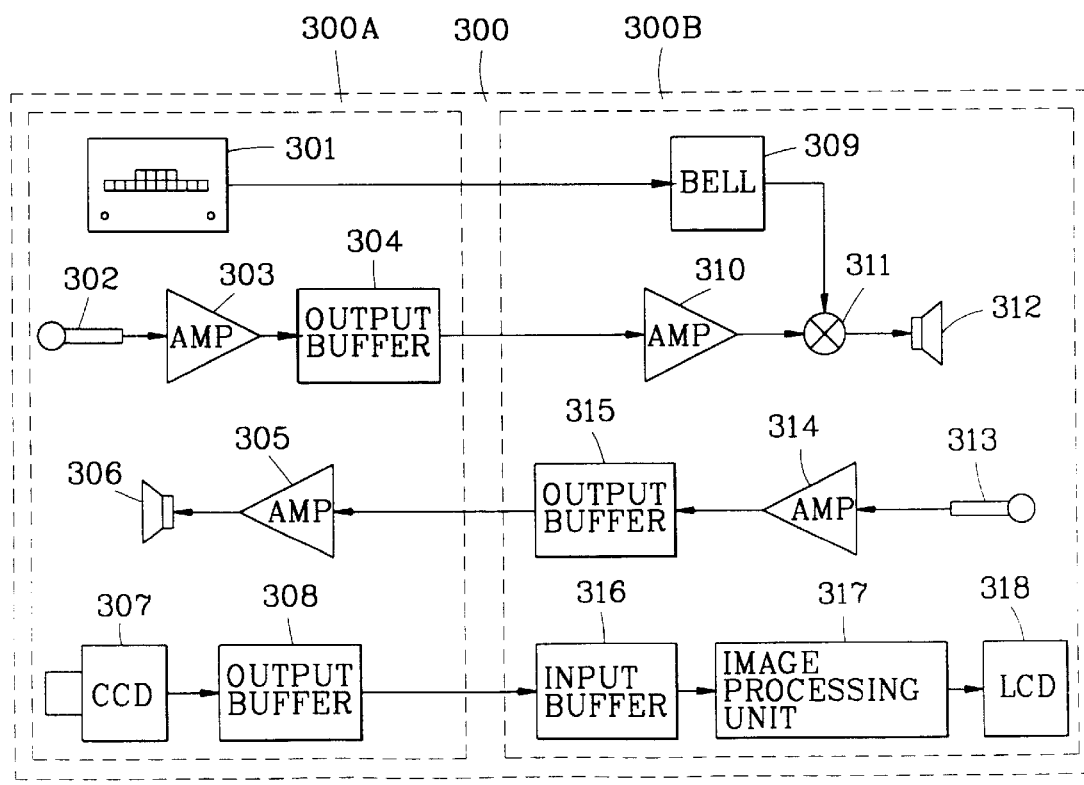
FIG. 2 is a block diagram of a conventional doorphone system.

Now, the image information transmitting device according to the present invention will be described referring to FIG. 4 which is a block diagram of an image information transmitting device according a second embodiment of the present invention. Since the construction of the doorphone system 300 is the same as the conventional art illustrated in FIG. 2, the description thereof will be omitted.

Figure 4:
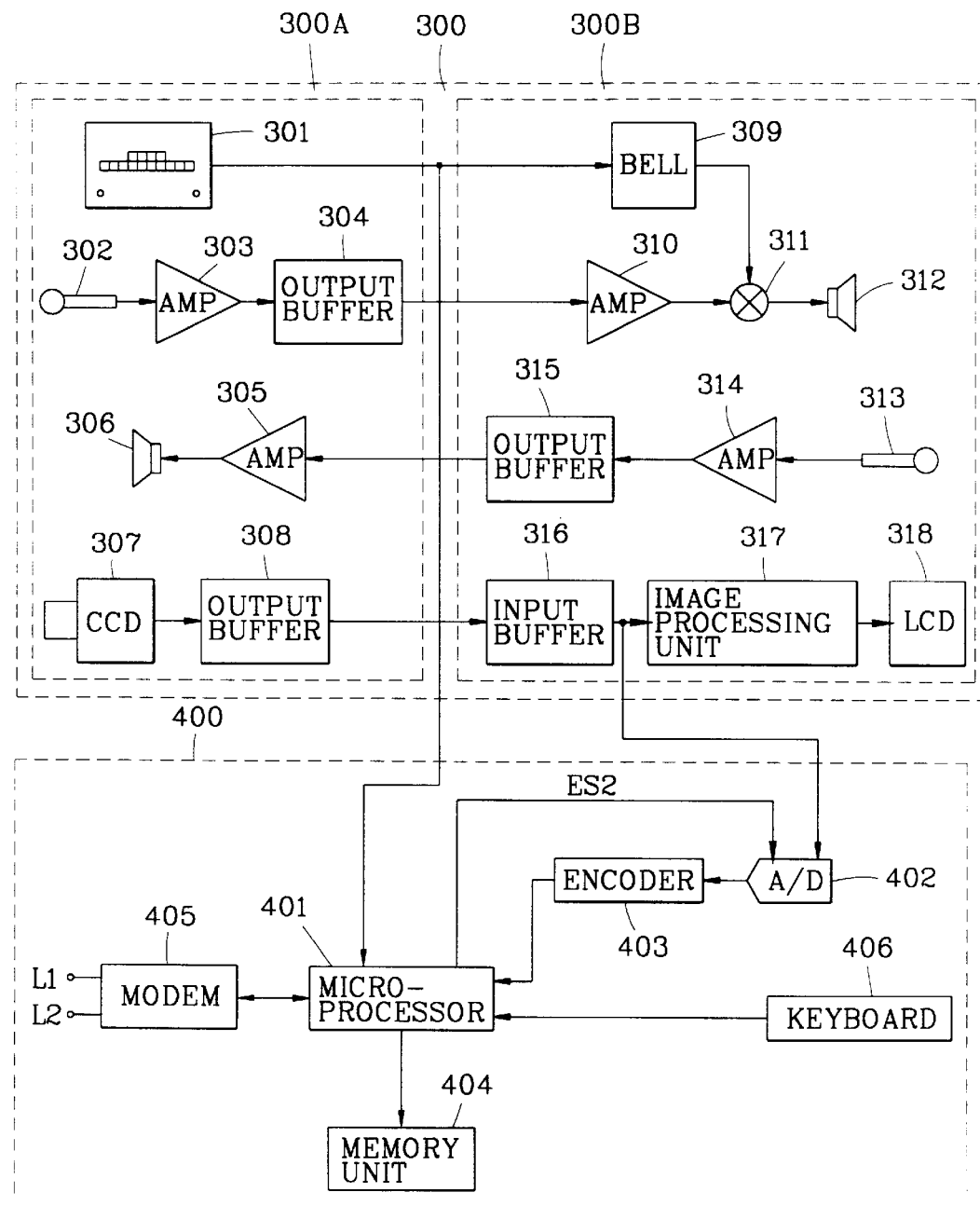
FIG. 4 is a block diagram of an image information transmitting device according to an embodiment of the present invention.

As shown in FIG. 4, an internet box 400 includes a microprocessor 401, an A/D converter 402, an image processing encoder 403, a memory unit 404 and a modem 405. The microprocessor 401, connected with an output terminal of the bell switch 301 of the doorphone system 300, starts to operate in accordance with the bell signal supplied from the bell switch 301 and controls each unit of the internet box 400. The A/D converter 402 which operates in accordance with the microprocessor 401 converts an analog image signal outputted from the input buffer 316 of the doorphone system 300 to a digital image signal. The image processing encoder 403 encodes the digital image signal supplied from the A/D converter 402, and the memory unit 404 stores the encoded image information, and the digital image information stored in the memory unit 404 is converted by the microprocessor 401 and externally outputted over the modem 405. While, a keyboard 406 turns on the internet box 400 and sets up the operation time thereof.

The bell signal generated by which the visitor presses the bell switch 301 is inputted to the bell 309 of the internal device 300B of the doorphone system 300 and simultaneously inputted to the microprocessor 401. The CCD camera 307 operates when the bell switch 301 is pressed and picks up the image of the visitor, and the thusly picked-up image signal is inputted to the image processing unit 317 and the A/D converter 402, over the second output buffer 308 and the input buffer 316.

The microprocessor 401 starts operating in accordance with the inputted bell signal and applies an enable signal ES2 to the A/D converter 402. The A/D converter 402 converts the inputted analog image signal to the digital image signal which is encoded in the image processing encoder 403 and transmitted to the microprocessor 401. The microprocessor 401 stores the encoded digital image signal in the memory unit 404. Here, the digital image signal is stored in a screen unit. In addition, since a predetermined time is set up in the microprocessor 401, the operation of the A/D converter 402 is suspended after the predetermined time and thus the operation of storing the digital image signal in the memory unit 404 is completed.

During the predetermined time, digital image data corresponding to a plurality of screens are stored in the memory unit 404. Here, the predetermined time which is regarded as a period for which the digital data corresponding to the screens may sufficiently reflect the figure of the visitor can be adjusted by the user using the keyboard 406.

After the digital data storing operation, the microprocessor 401 converts the digital data to an e-mail image file. The modem 405 is connected to an internet and logged into an e-mail server under the control of the microprocessor 401, and accordingly the microprocessor 401 transmits the e-mail image file to a specific account of the e-mail server.

In addition, the microprocessor 401 may add index information, such as the visiting time of the visitor, to the e-mail image file.

Accordingly, the user connected with the internet can identify the visitor by searching the image file stored in the specific account of the e-mail server.

Meanwhile, each operation of the microprocessor 401, the A/D converter 402, the memory unit 404, the modem 405 is identical to the operation of the microprocessor 201, the A/D converter 202, the memory unit 202 and the modem 204, respectively, of the internet box 200.

Figure 5:
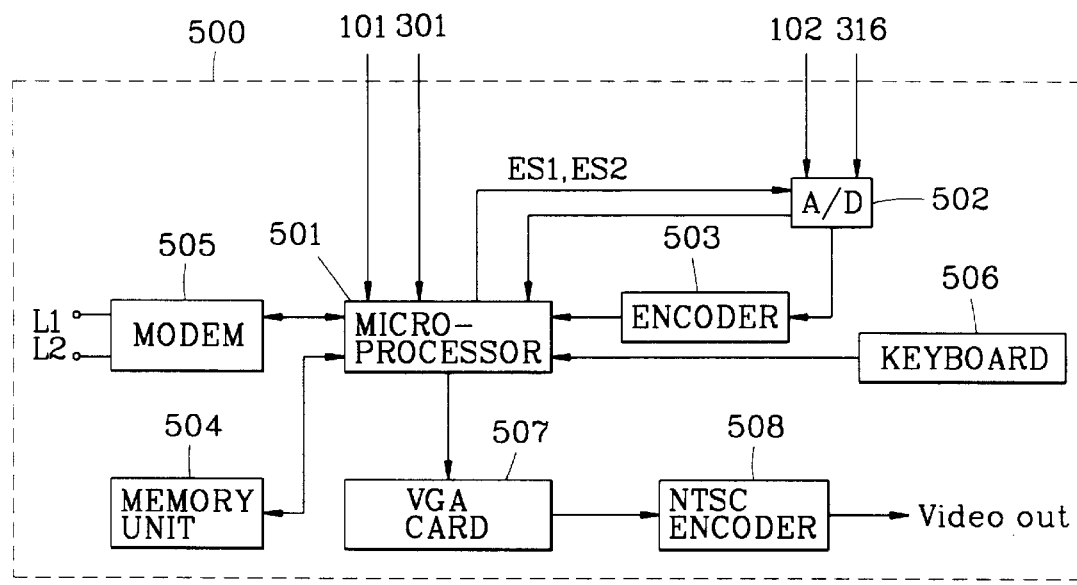
FIG. 5 is a block diagram of an audio and image information transmitting device according to an embodiment of the present invention.

Accordingly, it is possible to provide a single internet box which is able to process both of the audio information and the image information and the embodied device therefor is illustrated in FIG. 5.

FIG. 5 is a block diagram of an audio and image information transmitting device 500 according to a third embodiment of the present invention.

As shown therein, a microprocessor 501 is connected with the microprocessor 101 of the telephone device having the answering machine 100 as well as the output terminal of the bell switch 301 of the doorphone system 300. An A/D converter 502 is connected with the output terminal of the speech network unit 102 of the telephone device having the answering machine 100 and the output terminal of the input buffer 316 of the doorphone system 300. The microprocessor 501 outputs a first enable signal ES1 when receiving the signal from the microprocessor 101 of the device 100 and outputs a second enable signal ES2 when receiving the bell signal from the bell switch 301 of the doorphone system 300.

When receiving the first enable signal ES1, the A/D converter 502 converts an analog audio signal supplied from the speech network unit 102 to a digital audio signal which is supplied to the microprocessor 501, and similarly when receiving the second enable signal ES2, the same converts an analog image signal supplied from the input buffer 316 to a digital image signal which is encoded in the image processing encoder 503 and supplied to the microprocessor 501. The operation of the microprocessor 501 after receiving the analog audio signal and the analog image signal is the same as those described in both of the first and second embodiments of the invention.

As shown in FIG. 5, a VGA card 507 and an NTSC encoder 508 are additionally provided and a transmitting/receiving mode selecting function is added to the keyboard 506 so that the user may receive the image information stored in the specific account by connecting the internet box 500 with the e-mail server.

When the user switches the mode of the internet box 500 to the receiving mode by operating the keyboard 506, the image information supplied from the server is inputted over the telephone lines L1, L2 to the microprocessor 501 which transmits the image information to the VGA card 507. The VGA card 507 and the NTSC encoder 508 sequentially process the image information, for thereby outputting a video signal. Though not shown, a display device such as a TV monitor may be connected with the output terminal of the NTSC encoder 508 so that the user may identify the visitor therethrough.

As described above, the invention provides the device that transmits the audio information with respect to the message recorded in the answering machine to the e-mail server so that the user can check the telephone message using the e-mail although he/she is away from home, also since the device transmits the image information of the visitor which is supplied from the doorphone system to the e-mail server, the user can identify the visitor using the internet even outside. Further, it is more money-saving to use the internet e-mail rather than to make the phone call in order to check the information from a longdistance area or overseas.

It will be apparent to those skilled in the art that various modifications and variations can be made in the audio and image information transmitting device of the present invention without departing from the spirit or scope of the invention. Thus, it is intended that the present invention cover the modifications and variations of this invention provided they come within the scope of the appended claims and their equivalents.

What is claimed is:

1. An audio and image information transmitting device for directly connecting to a consumer electronic device, comprising:
   an information converter to convert an inputted analog audio or image signal from the directly connected consumer electronic device to a digital signal;
   a memory;
   a controller to control the storing of the digital signal outputted from the information converter in the memory and converting digital data stored in the memory to an e-mail file; and
   a modem to log into an internet server and transmit the e-mail file from the controller by e-mail.

2. An audio and image information transmitting device, comprising:
   an information converter to convert an inputted analog audio or image signal to a digital signal;
   a memory;
   a controller to control the storing of the digital signal outputted from the information converter in the memory and converting digital data stored in the memory to an e-mail file; and
   a modem to log into an internet server and transmit the e-mail file from the controller by e-mail, wherein the information converter includes,
      an analog/digital converter converting an analog audio signal outputted from a telephone device having an answering machine or an analog image signal from a CCD camera of a doorphone system to a digital audio signal or a digital image signal, respectively, and
      an image processing encoder encoding the digital image signal outputted from the analog/digital converter and outputting the encoded signal to the controller.

3. The device of claim 2, wherein the controller outputs a first enable signal to the analog/digital converter when receiving a signal from the telephone device having the answering machine or a second enable signal to the analog/digital converter when receiving a bell signal from a bell switch of the doorphone system, and the analog/digital converter converts the analog audio signal to the digital audio signal in accordance with the first enable signal and outputs the digital audio signal to the controller or converts the analog image signal to the digital image signal in accordance with the second enable signal and outputs the digital image signal to the image processing encoder.

4. The device of claim 1, wherein the controller adds index information to the e-mail file.

5. The device of claim 1, further comprising:
   a keyboard for turning on/off the controller.

6. An audio information transmitting device, comprising:
   an analog/digital converter to convert an analog audio signal supplied from a telephone device to a digital audio signal;
   a memory;
   a controller to control storing of the digital audio signal in the memory and to convert digital data stored in the memory to an e-mail file; and
   a modem to log into an internet server and transmit the e-mail file from the controller by e-mail.

7. The device of claim 6, wherein the controller starts operating in accordance with the telephone device and enables the analog/digital converter.

8. The device of claim 6, wherein the controller adds index information to the e-mail file.

9. The device of claim 6, further comprising:
   a keyboard for turning on/off the controller.

10. An image information transmitting device for directly connecting to a consumer electronics device, comprising:
    an analog/digital converter to convert an analog image signal from a CCD camera in the directly connected consumer electronic device to a digital image signal;
    an image processing encoder to encode the digital image signal outputted from the analog/digital converter;
    a memory;
    a controller to control the storing of the encoded signal in the memory to convert digital data stored in the memory to an e-mail file; and
    a modem for logging into an internet server and transmitting the e-mail file from the controller by e-mail.

11. The device of claim 10, wherein the controller enables the analog/digital converter.

12. The device of claim 10, wherein the controller adds index information to the e-mail file.

13. The device of claim 10, further comprising:
    a keyboard for setting up operation time of the controller.

14. The device of claim 1, wherein the information converter converts an analog audio signal from a directly connected telephone answering machine.

15. The device of claim 14, wherein the information converter begins converting the audio signal when the answering machine begins recording a message.

16. The device of claim 1, wherein the information converter converts an analog image signal from a directly connected doorphone system.

17. The device of claim 16, wherein the information converter begins converting the image signal when a camera in the doorphone system begins operating.

18. The device of claim 10, wherein the directly connected consumer electronic device is a doorphone system.

19. The device of claim 18, wherein the information converter begins converting the image signal when a camera in the doorphone system begins operating.

20. An audio information transmitting device, comprising:

a memory to store a digital audio signal from a consumer electronic device;

a controller to control the storing of the digital audio signal in the memory and to convert digital data stored in the memory to an e-mail file; and a modem to log into an internet server and transmit the e-mail file from the controller by e-mail.

* * * * *